US008330748B2

(12) United States Patent
Sagano

(10) Patent No.: US 8,330,748 B2
(45) Date of Patent: Dec. 11, 2012

(54) IMAGE DISPLAY APPARATUS, CORRECTION CIRCUIT THEREOF AND METHOD FOR DRIVING IMAGE DISPLAY APPARATUS

(75) Inventor: Osamu Sagano, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 966 days.

(21) Appl. No.: 12/390,051

(22) Filed: Feb. 20, 2009

(65) Prior Publication Data

US 2009/0219308 A1 Sep. 3, 2009

(30) Foreign Application Priority Data

Feb. 29, 2008 (JP) ................................. 2008-050346

(51) Int. Cl.
*G06F 3/038* (2006.01)

(52) U.S. Cl. ............... 345/208; 345/55; 345/77; 345/63

(58) Field of Classification Search .................... 345/59, 345/204, 690
See application file for complete search history.

(56) References Cited

U.S. PATENT DOCUMENTS

| | | | | |
|---|---|---|---|---|
| 5,659,328 | A | 8/1997 | Todokoro et al. | 345/74 |
| 5,734,361 | A | 3/1998 | Suzuki et al. | 345/74 |
| 6,653,794 | B2 | 11/2003 | Sagano et al. | 315/169.2 |
| 6,842,160 | B2 | 1/2005 | Yamazaki et al. | 345/76 |
| 6,870,522 | B2 | 3/2005 | Sagano et al. | 345/75.2 |
| 6,952,193 | B2 | 10/2005 | Abe et al. | 345/87 |
| 7,046,219 | B2 | 5/2006 | Kanai et al. | 345/75.2 |
| 7,079,161 | B2 | 7/2006 | Sagano et al. | 345/690 |
| 7,315,314 | B2 | 1/2008 | Sagano et al. | 345/690 |
| 7,417,610 | B2 | 8/2008 | Abe et al. | 345/87 |
| 2003/0006976 | A1 * | 1/2003 | Sagano et al. | 345/204 |
| 2003/0030654 | A1 | 2/2003 | Sagano et al. | 345/660 |
| 2004/0257311 | A1 | 12/2004 | Kanai et al. | 345/75.2 |
| 2005/0007328 | A1 | 1/2005 | Yamazaki et al. | 345/89 |
| 2005/0190119 | A1 * | 9/2005 | Yamazaki et al. | 345/59 |
| 2009/0009450 | A1 | 1/2009 | Abe et al. | 345/87 |

FOREIGN PATENT DOCUMENTS

| | | |
|---|---|---|
| JP | 2-257553 | 10/1990 |
| JP | 7-181911 | 7/1995 |
| JP | 8-248920 | 9/1996 |
| JP | 2003-223131 | 8/2003 |
| JP | 2003-233344 | 8/2003 |
| JP | 2005-31636 | 2/2005 |

* cited by examiner

*Primary Examiner* — Quan-Zhen Wang
*Assistant Examiner* — Troy Dalrymple
(74) *Attorney, Agent, or Firm* — Fitzpatrick, Cella, Harper & Scinto

(57) ABSTRACT

An image display apparatus includes: a correction circuit that outputs corrected data based on luminance data designating luminance of display devices, and a modulation circuit that outputs a pulse width modulation signal for driving the display device to the column wiring based on the corrected data. The correction circuit includes: a luminance calculation circuit that calculates luminance including an effect of a voltage drop in the row wiring and an effect of a light emission time of the display device for each predetermined time slot; an accumulation circuit that temporally accumulates the luminance for each time slot; and a corrected data determination circuit that outputs, as the corrected data, a value determined in accordance with the time slot at a time point when an accumulated luminance value obtained by the temporal accumulation reaches a target luminance value.

13 Claims, 12 Drawing Sheets

MODULATED PULSE
TIME

VOLTAGE DROP AMOUNT ΔV
TIME

EMISSION CURRENT Ie
TIME

ΔL1
TIME

ΔL2
TIME

ΔL (=ΔL1 × ΔL2)
L
L=Σ ΔL
TIME

FIG. 11

| | BLOCK 0 | BLOCK 1 | BLOCK 2 | BLOCK 3 |
|---|---|---|---|---|
| ≧0 | 7 | 7 | 7 | 7 |
| ≧4 | 6 | 7 | 6 | 6 |
| ≧8 | 6 | 7 | 5 | 6 |
| ≧12 | 5 | 6 | 5 | 6 |
| ≧16 | 5 | 6 | 5 | 4 |
| ⋮ | ⋮ | ⋮ | ⋮ | ⋮ |
| ≧252 | 2 | 2 | 1 | 0 |
| =255 | 1 | 0 | 0 | 0 |

IMAGE DISPLAY APPARATUS, CORRECTION CIRCUIT THEREOF AND METHOD FOR DRIVING IMAGE DISPLAY APPARATUS

BACKGROUND OF THE INVENTION

1. Field of the Invention

This invention relates to an image display apparatus.

2. Description of the Related Art

Japanese Patent Application Laid-Open No. 2-257553 discloses a technique for controlling the pulse width of the voltage applied to each of the modulation electrodes to compensate for the variation in the amount of the electron beams emitted from plural electron-emitting devices due to the variation of the voltages applied to the electron-emitting devices.

Japanese Patent Application Laid-Open No. 8-248920 (U.S. Pat. No. 5,734,361) discloses an image forming apparatus using electron-emitting devices arranged in simple matrix. This image forming apparatus includes a drive signal generating means for outputting a drive pulse to plural column wirings for driving a cold cathode devices connected to a selected row wiring. This drive signal generating means outputs a drive pulse corrected by a correction value corresponding to each column wiring.

Japanese Patent Application Laid-Open No. 2003-223131 (US 2003/0006976 A1; U.S. Pat. No. 7,079,161) discloses a configuration in which in order to reduce the hardware for calculating the correction value, the row wirings have plural reference positions for which a correction value is determined. The apparatus also discloses the configuration in which the correction values other than those for the reference positions are determined by interpolating the correction values determined for the reference positions. Japanese Patent Application Laid-Open No. 2003-223131 (US 2003/0006976 A1; U.S. Pat. No. 7,079,161) further discloses a method for calculating the voltage drop amount using a degenerate model and an algorithm for calculating the correction value from the voltage drop amount.

In the method disclosed by Japanese Patent Application Laid-Open No. 2003-223131 (US 2003/0006976 A1; U.S. Pat. No. 7,079,161), the voltage drop amount is estimated from the image data before correction and the correction value of the image data is determined based on the voltage drop amount thus estimated. In the case where the shape of the drive pulse changes due to the correction, the voltage drop status changes and the emission current amount may also change. The method disclosed by Japanese Patent Application Laid-Open No. 2003-223131 (US 2003/0006976 A1; U.S. Pat. No. 7,079,161), however, approximately ignores the change in the voltage drop status due to the correction. In the case where this correction method is used for a display panel large in voltage drop amount, therefore, the correction error is so large that the image quality may be deteriorated.

SUMMARY OF THE INVENTION

In the image display apparatus, a signal loss such as a voltage drop deteriorates the quality of the image displayed. Efforts have been made in the past to suppress the image quality deterioration by the correction, and the correction with a higher accuracy is desired.

The object of this invention is to provide a technique for improving the accuracy of correction of the voltage drop and realizing the image display of high quality.

According to a first aspect of the invention, there is provided an image display apparatus for driving plural display devices through plural row wirings and plural column wirings in matrix, including:

a correction circuit that outputs corrected data based on luminance data designating luminance of the display device; and a modulation circuit that outputs a pulse width modulation signal for driving the display devices to the column wiring based on the corrected data, wherein the correction circuit includes:

a luminance calculation circuit that calculates luminance including an effect of a voltage drop in the row wiring and an effect of a light emission time of the display device for each predetermined time slot;

an accumulation circuit that temporally accumulates the luminance for each time slot; and a corrected data determination circuit that outputs, as the corrected data, a value determined in accordance with the time slot at a time point when an accumulated luminance value obtained by the temporal accumulation reaches a target luminance value.

According to a second aspect of the invention, there is provided a correction circuit of the image display apparatus, wherein the image display apparatus is adapted to drive plural display devices through plural row wirings and plural column wirings in matrix and includes a modulation circuit for outputting a pulse width modulation signal for driving the display devices to the column wiring, wherein the correction circuit includes:

a luminance calculation circuit that calculates luminance including an effect of a voltage drop in the row wiring and an effect of a light emission time of the display device for each predetermined time slot;

an accumulation circuit that temporally accumulates the luminance for each time slot; and a corrected data determination circuit that outputs, as the corrected data, a value determined in accordance with the time slot at a time point when an accumulated luminance value obtained by the temporal accumulation reaches a target luminance value.

According to a third aspect of the invention, there is provided an image display apparatus driving method for driving plural display devices through plural row wirings and plural column wirings in matrix, including:

a correction step of outputting corrected data based on luminance data designating luminance of the display device; and a modulation step of outputting a pulse width modulation signal for driving the display device to the column wiring based on the corrected data;

wherein the correction step includes:

a luminance calculation step of calculating luminance including an effect of a voltage drop in the row wiring and an effect of a light emission time of the display device for each predetermined time slot;

a step of temporally accumulating the luminance for each time slot; and a step of outputting, as the corrected data, a value determined in accordance with the time slot at a time point when an accumulated luminance value obtained by the temporal accumulation reaches a target luminance value.

According to this invention, the voltage drop correction accuracy is improved and the image display high in quality can be realized.

Further features of the present invention will become apparent from the following description of exemplary embodiments with reference to the attached drawings.

BRIEF DESCRIPTION OF THE DRAWINGS

FIG. 11 is a diagram showing an example of a histogram calculated for the image data on a given row.

DESCRIPTION OF THE EMBODIMENTS

Figure 1:
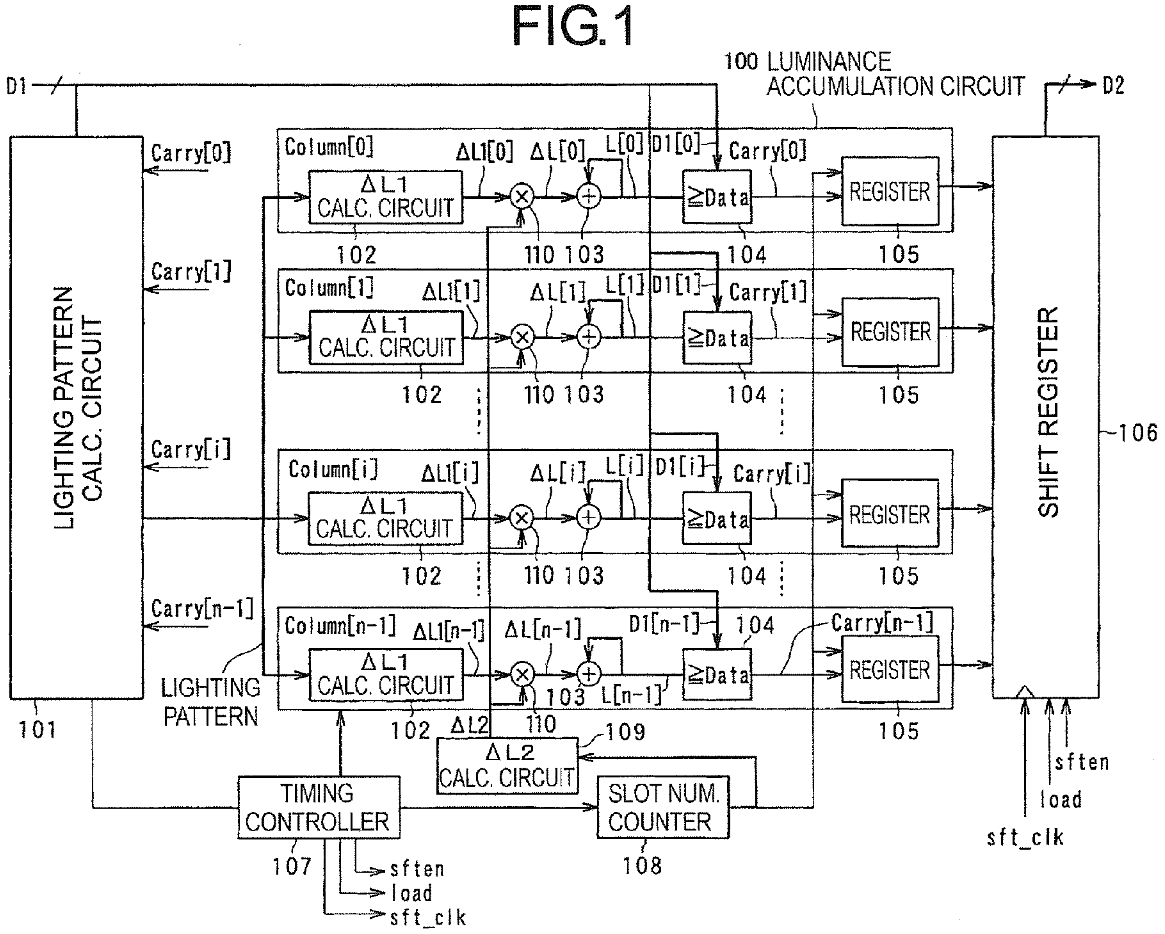
FIG. 1 is a diagram showing a configuration of a corrected data calculation unit according to a first embodiment.

This invention is preferably applicable to a display apparatus for displaying an image by driving plural display devices (display elements). This invention is especially preferably applicable to a display apparatus configured so that the loss of the signal supplied to a predetermined display device has an effect on the lighting state of other display devices. In the case where plural display devices are connected in one row wiring (scan wiring) and each of the display devices is connected with the column wiring (modulation wiring), for example, the lighting state of each display device is affected by the lighting state of other display devices. A more specific example is a configuration in which plural display devices are driven in line sequence in plural row wirings and plural column wirings in matrix. The display devices are driven by supplying the scanning signal to the row wiring as a shared wiring and supplying the modulation signals from the column wirings. In the process, the signal level on the row wiring is varied from one position to another on the row wiring. This is by reason of the fact that a voltage drop is caused by the current flowing in the row wiring. The voltage drop, i.e. the signal loss is large, therefore, at a position of a large distance from the signal source. The value of the current flowing in the row wiring is determined by the driving state (lighting state) of each display device. The driving state of each display device is determined, for example, by the data such as the luminance data designating the luminance (brightness) of each display device. Therefore, the signal loss depends on the image to be displayed as well as the distance from the position of the signal source.

This invention is preferably applicable to the image display apparatus having a display panel (matrix panel) with a multiplicity of display devices arranged in matrix. This type of the image display apparatus includes the electron beam display apparatus, the plasma display apparatus, the liquid crystal display apparatus or the organic EL display apparatus. The electron beam display apparatus preferably uses, as a display device, a cold cathode device (electron-emitting device) such as the field emission electron-emitting device, the MIM (metal/insulator/metal) electron-emitting device or the surface conduction electron-emitting device. This invention is especially applicable preferably to the image display apparatus using a display device having the light emission characteristic with the luminance changing with the light emission time. In the cold cathode device for emitting electrons to the phosphor, for example, the luminance may be changed due to the saturation characteristic of the phosphor. The cold cathode device (electron-emitting device), therefore, is a preferable form of application of the invention.

The configuration having the surface conduction electron-emitting device as an electron-emitting device is illustrated below. The surface conduction electron-emitting device is especially preferable as an application of the invention due to the feature that a great amount of the current flows in the row wiring and the voltage drop amount is large.

Embodiments of the invention are explained below with reference to the drawings.

First Embodiment

The image display apparatus according to the first embodiment generally includes a display panel with plural surface conduction electron-emitting devices arranged in simple matrix, a driving circuit (scan circuit, modulation circuit) for driving the display panel, and a correction circuit. According to this embodiment, the driving circuit drives the row wirings (scan wirings) in line sequence and applies the modulation pulse in which at least a pulse width is modulated to the column wirings (modulation wirings). The lighting time of each device is controlled by the pulse width. In addition to the lighting time control by the pulse width modulation (PWM), the lighting strength within a lighting period is desirably controlled by the pulse height modulation (PHM). In the description that follows, however, only the pulse width modulation is shown as an example to facilitate the understanding.

In the image display apparatus according to this embodiment, the input image data is corrected by the correction circuit and the corrected image data is transmitted to the driving circuit thereby to correct the effect of the voltage drop constituting a signal loss. As a result, a desirable image can be displayed on the image display apparatus. Further, in the image display apparatus according to this embodiment, the correction is made also taking the saturation characteristic of the phosphor into consideration to realize the correction with higher accuracy.

First, with reference to FIGS. 9A to 9C and FIGS. 10A to 10F, the luminance estimation method constituting the fundamentals of the correction method according to this embodiment is explained.

The voltage drop caused in the row wiring by the drive with the pulse width modulation has the following characteristics:

(1) The voltage drop amount changes with the number of the devices turned on (emitting light).

(2) In the pulse width modulation, the number of the devices turned on changes within one scanning period, and therefore, the voltage drop amount changes in one scanning period.

Incidentally, the relation between the pulse width modulation and the voltage drop are described in detail in Japanese Patent Application Laid-Open No. 2003-223131 (US 2003/0006976 A1; U.S. Pat. No. 7,079,161).

Figure 9A:
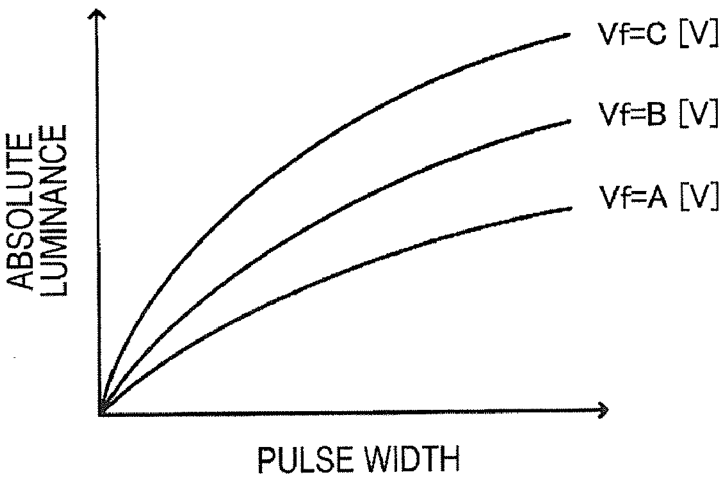
FIG. 9A is a diagram showing the relation between a modulation pulse width and absolute luminance of a surface conduction electron-emitting device.
Figure 9B:
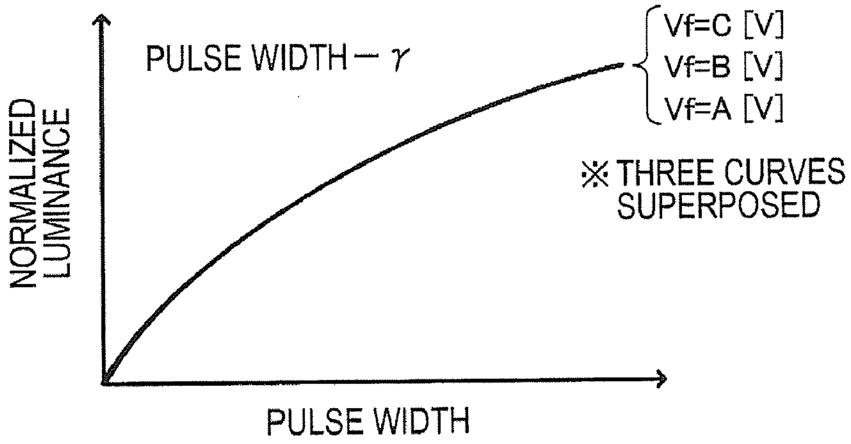
FIG. 9B is a diagram for explaining the saturation phenomenon in the direction of pulse width.
Figure 9C:
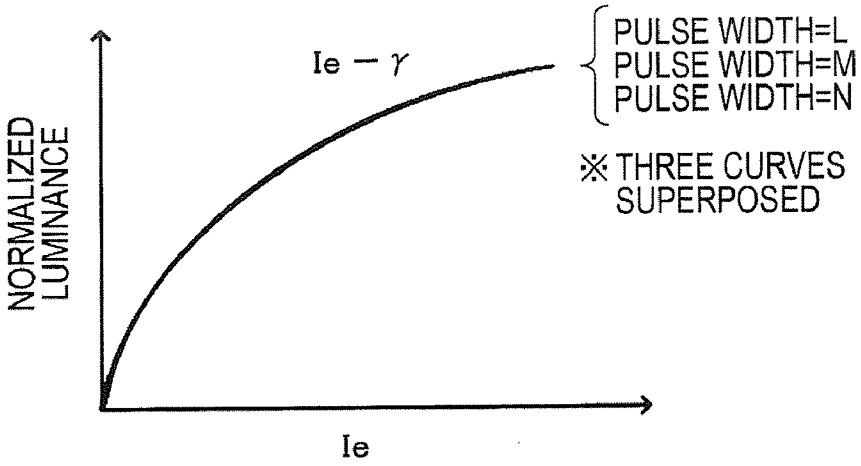
FIG. 9C is a diagram for explaining the saturation phenomenon in the direction of the emission current (the direction of the applied voltage)

With reference to FIGS. 9A to 9C, the light emission characteristic for the pulse width modulation of the display panel is explained. FIG. 9A is a diagram showing the relation between the modulated pulse width and the absolute luminance with the applied voltage Vf to the surface conduction electron-emitting device as a parameter. Incidentally, the applied voltage is defined as a voltage supplied to the surface conduction electron-emitting device by the row and column wirings. The graph of FIG. 9A shows the three curves of the applied voltages A, B and C, where A<B<C.

As shown in FIG. 9A, the increase in pulse width or applied voltage increases the luminance L substantially linearly. The increase in the luminance L, however, is not completely linear but tends to be saturated. The emission current is determined uniquely with respect to the applied voltage (Japanese Patent Application Laid-Open No. 2003-223131 (US 2003/0006976 A1; U.S. Pat. No. 7,079,161) (FIG. 3)). As long as the applied voltage remains constant as in the pulse width modulation, therefore, the current amount emitted from the device is constant. A lengthened light emission time, however, reduces the light emission efficiency due to the saturation of the phosphor, and the luminance fails to increase linearly. A similar phenomenon occurs also in the case where the pulse width is fixed and the applied voltage is increased. Specifically, although the emission current is increased with the increase in applied voltage, the increase in the emitted light luminance with respect to the emission current is not completely linear due to the saturation of the phosphor.

FIG. 9B is a diagram for explaining the saturation phenomenon along the direction of a pulse width. In the graph of FIG. 9B, the three curves shown in FIG. 9A are normalized, respectively, with the luminance for the maximum pulse width as unity (1). The three curves coincide with each other as the result of scaling by this normalization. This indicates that the saturation in the direction along the pulse width (along time axis) is not related to the value of the emission current (applied voltage) and uniquely determined by the length of the pulse width (light emission time).

FIG. 9C is a diagram for explaining the saturation phenomenon in the direction of the emission current (the direction of the applied voltage). In FIG. 9C, the horizontal axis represents the emission current Ie, and the vertical axis the normalized luminance. In the graph of FIG. 9C, three curves of emission current versus luminance obtained for three types of pulse width L, M and N are normalized based on the luminance of the pulse width L. As the result of this normalization, the saturation characteristic with respect to the magnitude of the emission current can be expressed in one curve. This indicates that the saturation in the direction of the emission current (the direction of the applied voltage) is unrelated to the pulse width and uniquely determined by the value of the emission current (applied voltage).

This phosphor saturation is closely related to the pulse width modulation and the voltage drop. Specifically, as described above, the voltage drop with the pulse width modulation has the feature of changing within a horizontal scanning period. Once a voltage drop occurs, the emission current changes so that the degree to which the phosphor is saturated is changed.

In other words, the accurate correction of the effect of the voltage drop requires that the pulse width is determined while estimating the luminance by taking the reduction in the emission current due to the voltage drop and the resulting phosphor saturation into consideration.

FIGS. 10A to 10F are diagrams for explaining a method of calculating the light emission luminance taking the effect of the voltage drop in the row wiring and the effect of the light emission time of the display devices into consideration.

Figures 10A, 10B, 10C, 10D, 10E, 10F:
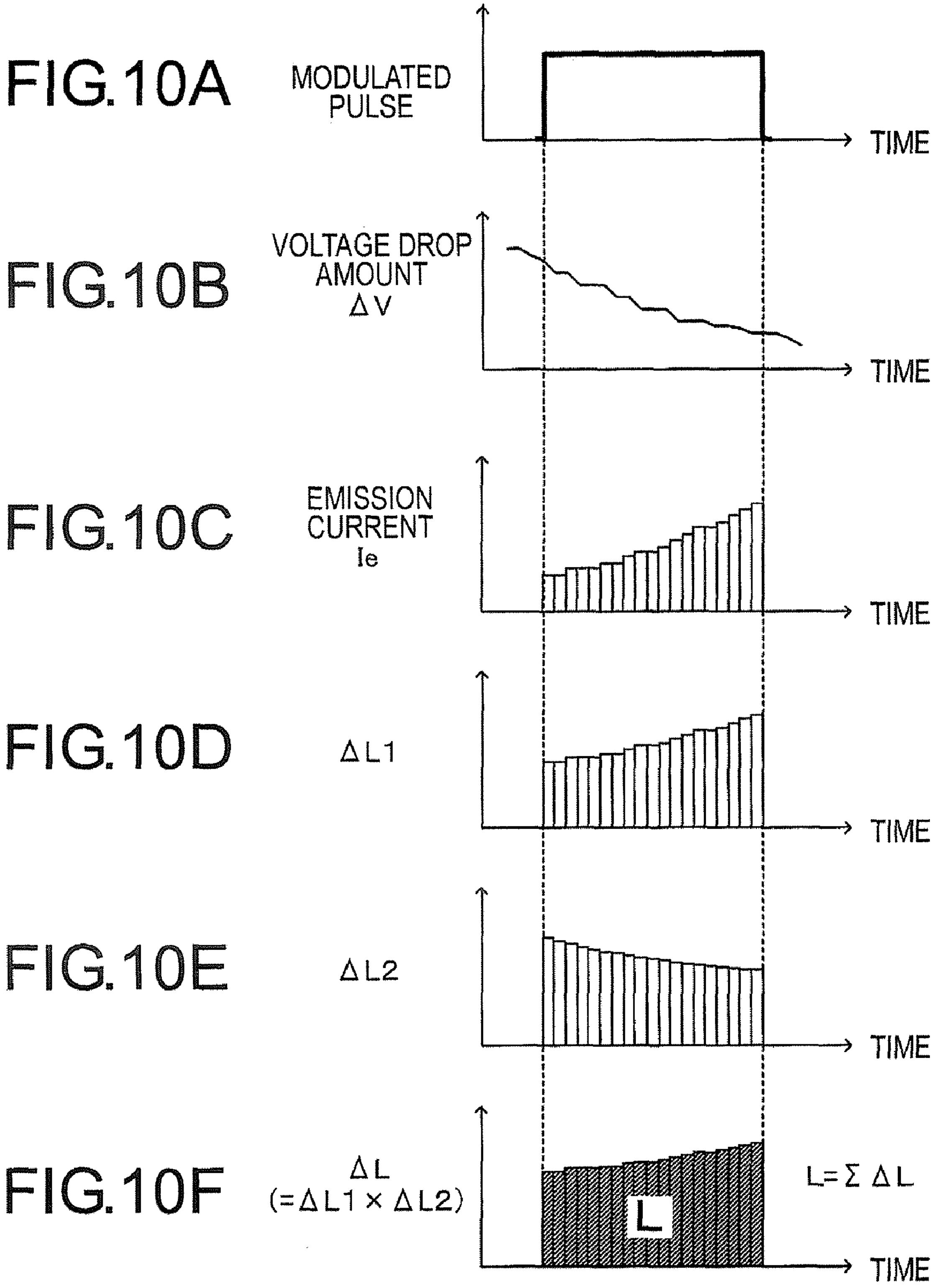
FIGS. 10A to 10F are diagrams for explaining a method of calculating the light emission luminance taking both the effect of the voltage drop in the row wiring and the effect of the light emission time of the display device into consideration.

Assume that the voltage drop shown in FIG. 10B occurs on the row wiring upon application of the modulated pulse shown in FIG. 10A to the column wirings. A large voltage drop reduces the applied voltage, and therefore, the magnitude of the emission current is as shown in FIG. 10C. Taking only the saturation with respect to the emission current (i.e. the phenomenon of FIG. 9C) into consideration, the luminance ΔL1 at each time is as shown in FIG. 10D. The first luminance ΔL1 includes the effect of the voltage drop on the row wiring at each time.

As shown in FIG. 9B, the phosphor saturation exists also in the direction of pulse width. FIG. 10E is a curve obtained by temporal differentiation of the phosphor saturation curve in the direction along the pulse width shown in FIG. 9B. The curve of FIG. 10E indicates the rate at which the luminance increases with the pulse width increased by one slot. In the area where the pulse is short, the luminance increase ΔL2 with the one-slot increase is large. This increment gradually decreases, however, according as the pulse is lengthened. The second luminance ΔL2 includes the effect of the light emission time of the display devices at each time.

This result of phosphor saturation shows that the instantaneous luminance ΔL at each time should be calculated based on both the first luminance ΔL1 and the second luminance ΔL2. Here, it is preferable that the first luminance ΔL1 is normalized to indicate the ratio to the luminance free of the effect of the voltage drop, and the second luminance ΔL2 is normalized to indicate the ratio to the luminance free of the effect of the light emission time. Then, the luminance ΔL taking both the first and second luminance into consideration is given as the product of the first luminance ΔL1 and the second luminance ΔL2 (FIG. 10F). The total luminance L obtained by the modulated pulse shown in FIG. 10A can be estimated by temporal accumulation of the instantaneous luminance ΔL at each time (the area of the hatched portion in FIG. 10F).

Next, an explanation is given about the image display apparatus having the correction circuit for correcting the voltage drop based on the luminance predicted by the calculation method described above.

(Image Display Apparatus)

Figure 2:
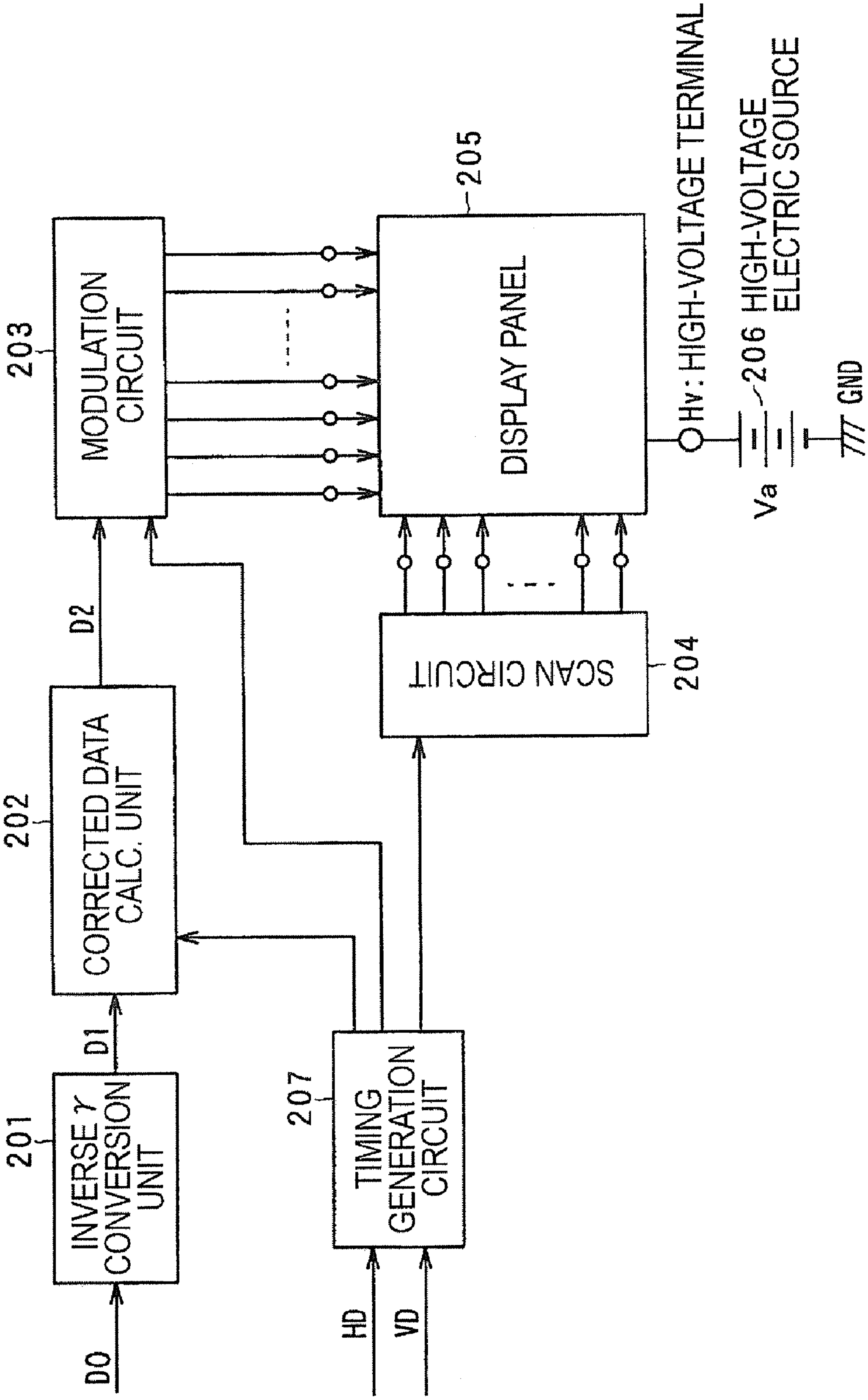
FIG. 2 is a block diagram showing an image display apparatus according to the first embodiment.

FIG. 2 is a block diagram showing the image display apparatus according to this embodiment. The image display apparatus includes an inverse γ conversion unit 201, a corrected data calculation unit 202, a modulation circuit 203, a scan circuit 204, a display panel 205, a high-voltage electric source 206 and a timing generation circuit 207.

(Display Panel 205)

Figure 12:
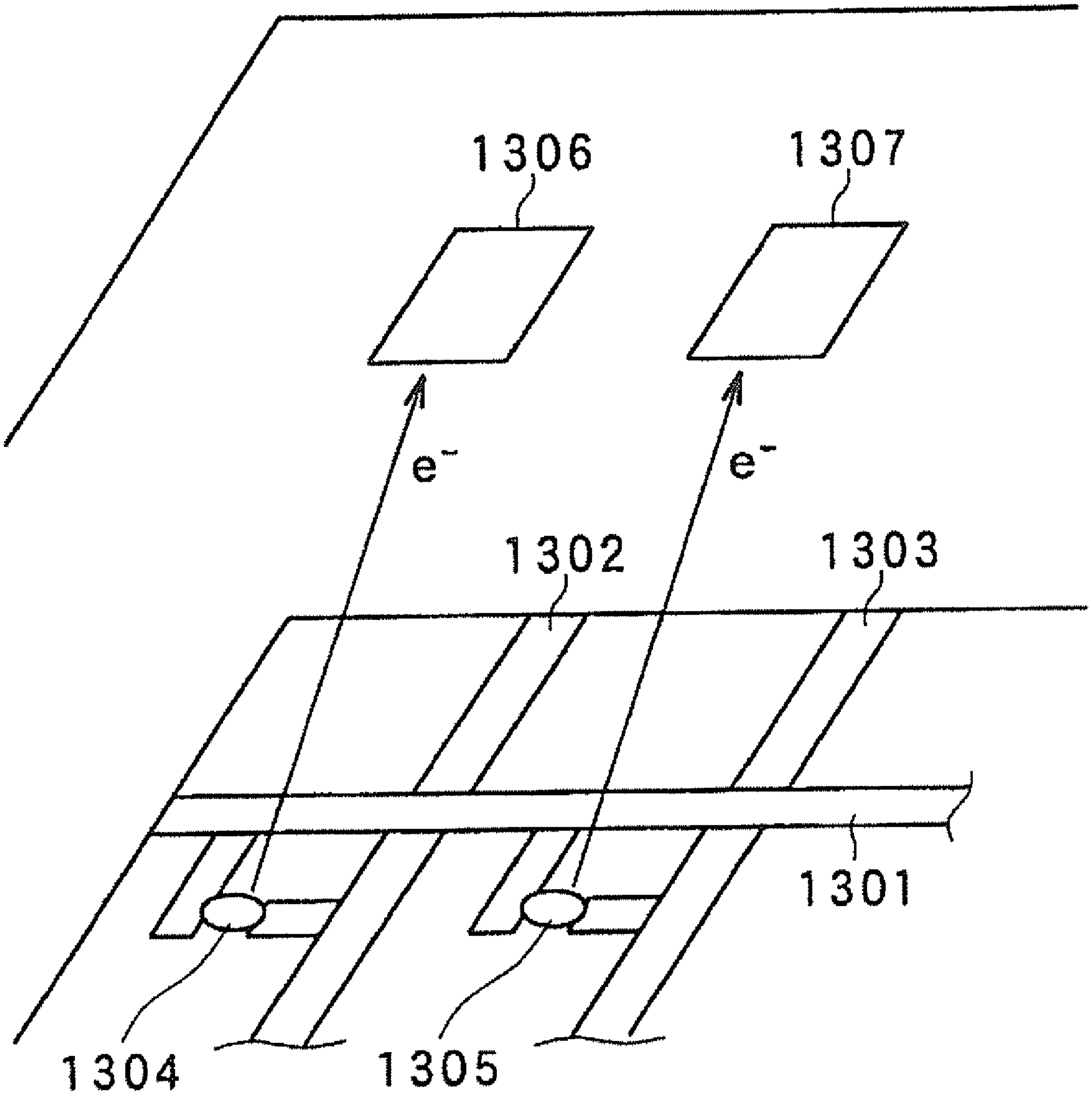
FIG. 12 is a diagram showing the structure of the display panel.

FIG. 12 schematically shows a structure of the display panel 205. The display panel 205 includes a rear plate and a face plate. Plural electron-emitting devices (display devices) 1304, 1305 are arranged on the rear plate (electron source board). The electron-emitting devices are connected in simple matrix by plural modulation wirings (column wirings)

1302, 1303 and plural scan wirings (row wirings) 1301. Light-emitting members (phosphor) 1306, 1307 corresponding to the electron-emitting devices 1304, 1305 are formed on the face plate. Also, the anode electrode called the metal back is arranged on the face plate. A high voltage Va is applied to the anode electrode from a high voltage electric source 206 through a high voltage terminal Hv.

The scan circuit 204 applies the scanning signal (select potential) to any one of the scan wirings and the modulation circuit 203 applies a modulation signal (modulated pulse) to each modulation wiring. Once the potential difference between the scanning signal and the modulation signal exceeds a threshold voltage, electrons are emitted from the corresponding electron-emitting device. The electrons are accelerated by the high voltage Va and collides against the light-emitting member, thereby emitting light. The image is formed by the mass of the light from the display devices. The luminance of the light is controlled by the radiation amount of electrons from the electron-emitting devices. The electron radiation amount is controlled by the magnitude and the application time of the voltage applied to the electron-emitting devices. In this way, the desired electron emission amount can be obtained by controlling the potential difference between the scanning signal and the modulation signal and the modulation signal application time within the scanning signal application period.

(Modulation Circuit 203)

The modulation circuit 203 is connected to the modulation wirings of the display panel 205. The corrected data D2 is input to the modulation circuit 203 from the corrected data calculation unit 202, and the timing data from the timing generation circuit 207. The modulation circuit 203 generates the pulse width modulation signal based on the corrected data D2 input thereto. Specifically, the modulation circuit 203 determines the non-off time (on time) of the modulation signal by counting the clock signal the number of times designated by the corrected data D2. One period of the clock signal constitutes the unit time (time slot) for controlling the lighting time of the display devices. In the pulse width modulation of M steps (M: an integer of 1 or more), for example, the drive period assigned to the drive of the display devices is divided into (M-1) time slots. Incidentally, the drive time is the period corresponding to the maximum pulse width and determined, for example, based on the horizontal scanning period or the row wiring selection period. The modulation circuit 203 outputs one row of the modulation signal to each modulation wiring.

(Scan Circuit 204)

The scan circuit 204 is connected to the scan wirings of the display panel 205. The scan circuit 204 supplies the scanning signal (select potential) to the scan wiring connected with the electron-emitting devices to be driven. Incidentally, the scan wirings not driven are supplied with a non-select potential. Generally, the scan circuit 204 scans the scan wirings in line sequence by selecting one row at a time. The scanning scheme employed includes the interlace scan or the multi-line scan with plural rows selected at a time.

(Timing Generation Circuit 207)

The timing generation circuit 207 generates the timing signal based on the horizontal sync HD and the vertical sync VD of the video signal. Each circuit of the image display apparatus operates based on this timing signal.

(Inverse γ Conversion Unit 201)

The inverse γ conversion unit 201 is supplied with the image data D0. The image data D0 corresponds to, for example, the color video signals R, G, B in the color image display apparatus. The R, G, B data are input to the inverse γ conversion unit 201 pixel by pixel.

The display panel 205 having the surface conduction electron-emitting devices has such a characteristic that the light of the luminance substantially linear against the pulse application time is emitted in the drive operation by pulse width modulation. The inverse γ conversion unit 201, therefore, generates the image data D1 by converting the image data D0 along the 2.2-power curve in order to adjust the image data to the linear luminance characteristic of the display panel 205. This image data D1 has a value proportional to the luminance. The inverse γ conversion unit 201 supplies the image data D1 to the corrected data calculation unit 202. This image data D1 is the luminance data for designating the luminance of the display devices.

(Correction Circuit; Corrected Data Calculation Unit 202)

In the pulse width modulation with the image data D1 having a value proportional to the luminance, the luminance cannot be obtained as expected. This is by reason of the fact that the voltage drop occurs in the row wirings as described above. In order to reduce the effect of the voltage drop and achieve a target luminance, the corrected data D2 to be supplied to the modulation circuit 203 is generated by the correction circuit based on the image data D1. According to the first embodiment, the corrected data calculation unit 202 corresponds to the correction circuit for correcting the voltage drop.

The corrected data calculation unit 202 outputs the corrected data D2 based on the image data D1. FIG. 1 shows the configuration of the corrected data calculation unit 202.

The corrected data calculation unit 202 includes a lighting pattern calculation circuit 101, a luminance accumulation circuit 100, a shift register 106, a timing controller 107 and a slot number counter 108. The luminance accumulation circuit 100 includes a ΔL1 calculation circuit 102, an accumulation circuit (accumulator) 103, a multiplier 110, a comparator 104 and a register 105. According to this embodiment, the luminance accumulation circuit 100 is arranged for each column wiring of the display panel 205. The provision of the luminance accumulation circuit 100 for each column wiring has the advantage that the corrective arithmetic operation of all the column wirings can be performed in parallel and the corrected data can be calculated at high speed. Further, the corrected data calculation unit 202 includes a ΔL2 calculation circuit 109.

The timing controller 107 controls the operation of the luminance accumulation circuit 100 and the operation of the slot number counter 108 for each modulation wiring. The timing controller 107 supplies the luminance accumulation circuit 100 with the clock signal for dividing the device drive period into plural slots. One period of the clock signal corresponds to the unit time (time slot) of one luminance calculation. The timing controller 107 can control the slot width by changing the period of the clock signal. The slot width may be constant or varied over the entire drive time.

The slot number counter 108 is a circuit for counting the number of slots in synchronism with the time slots. The value held in the slot number counter 108 coincides with the number of times the luminance calculation (luminance accumulation).

The ΔL1 calculation circuit 102 is a first luminance calculation circuit for calculating the first luminance ΔL1 including the effect of the voltage drop in the row wiring. Specifically, the ΔL1 calculation circuit 102 calculates the luminance ΔL1[I] at the modulation wiring I (column I) based on the lighting pattern of all the modulation wirings. The first luminance ΔL1[I] is a value indicating the instantaneous luminance of the I-th display device in a given time slot. The value of the first luminance ΔL1 is normalized in such a manner that the luminance is 1 in the absence of a voltage drop. The luminance ΔL1[I] is calculated for each slot.

The first luminance ΔL1 varies from one column to another. This is because the voltage drop amount is different at a different position on the row wiring. The voltage drop amount at each column can be calculated from the lighting pattern (the lighting state of each device) and the wiring resistance. Then, the voltage actually applied on the display devices at each column can be calculated from the voltage drop amount. Further, the luminance ΔL1 can be calculated from the voltage-emission current characteristic of the display devices and the phosphor saturation characteristic in the direction of the emission current described above (FIG. 9B). The first luminance ΔL1 may be calculated each time. In view of the fact that the first luminance ΔL1 is uniquely determined with respect to the lighting pattern, however, the ΔL1 calculation circuit 102 should be configured of a look-up table (memory) which stores the values of ΔL1 corresponding to respective lighting patterns. As a result, both the calculation load can be reduced and the circuit can be simplified.

The ΔL2 calculation circuit 109 is a second luminance calculation circuit for calculating the second luminance ΔL2 including the effect of the light emission time of the display devices for each time slot. Specifically, the ΔL2 calculation circuit 109 calculates the second luminance ΔL2 based on the value of the time slot (the value held in the slot number counter 108). The second luminance ΔL2 is shared by all the column wirings. The value of the second luminance ΔL2 is normalized in such a manner that the luminance free of the effect of the light emission time (pulse width) is unity (1). The luminance ΔL2 is calculated in a manner corresponding to each slot.

The second luminance ΔL2 may be also calculated each time. Since the value ΔL1 is uniquely determined for the light emission time (i.e. the pulse width or the time slot value), however, the ΔL2 calculation circuit 109 should be configured of a look-up table which stores the ΔL2 values corresponding to respective values of the time slot. Incidentally, the contents of the table coincide with the graph shown in FIG. 10E. The use of this table can both reduce the calculation load and simplify the circuits.

The multiplier 110 is a totaling circuit for calculating the instantaneous luminance ΔL for each time slot by multiplying the first luminance ΔL1 and the second luminance ΔL2.

The lighting pattern calculation unit 101 is for generating a lighting pattern for each time slot. The lighting pattern is data indicating the lighting state of all the display devices on the selected row (i.e. the voltage application state of all the column wirings). In the case where the lighting state of the display devices is indicated as 1 for on state and 0 for off state, for example, the lighting pattern with all the four display device (four column wirings) on is given as (1, 1, 1, 1).

According to this embodiment, no correction is made to shorten the lighting time. With regard to the first period (the period when the time slot T=0), therefore, the lighting state after correction is not required to be predicted. Therefore, the lighting state for the first period can be determined from the input image data. With regard to each of the second and subsequent periods, on the other hand, the lighting state of each display device may be affected by the correction, and therefore, it is not desirable to set the lighting state only by the input image data. According to this embodiment, therefore, the lighting state of each display device after correction is predicted, and the next correction calculation is carried out utilizing the predicted lighting state. To make this process possible, the lighting pattern set in the lighting pattern calculation circuit 101 is adapted to be rewritable based on the result of the correction calculation. Incidentally, the modulation signal is applied actually after complete arithmetic operation in the correction circuit. In the stage of the correction calculation, therefore, the correction result is yet to be reflected in the lighting operation.

(Operation of Corrected Data Calculation Unit 202)

Figure 3:
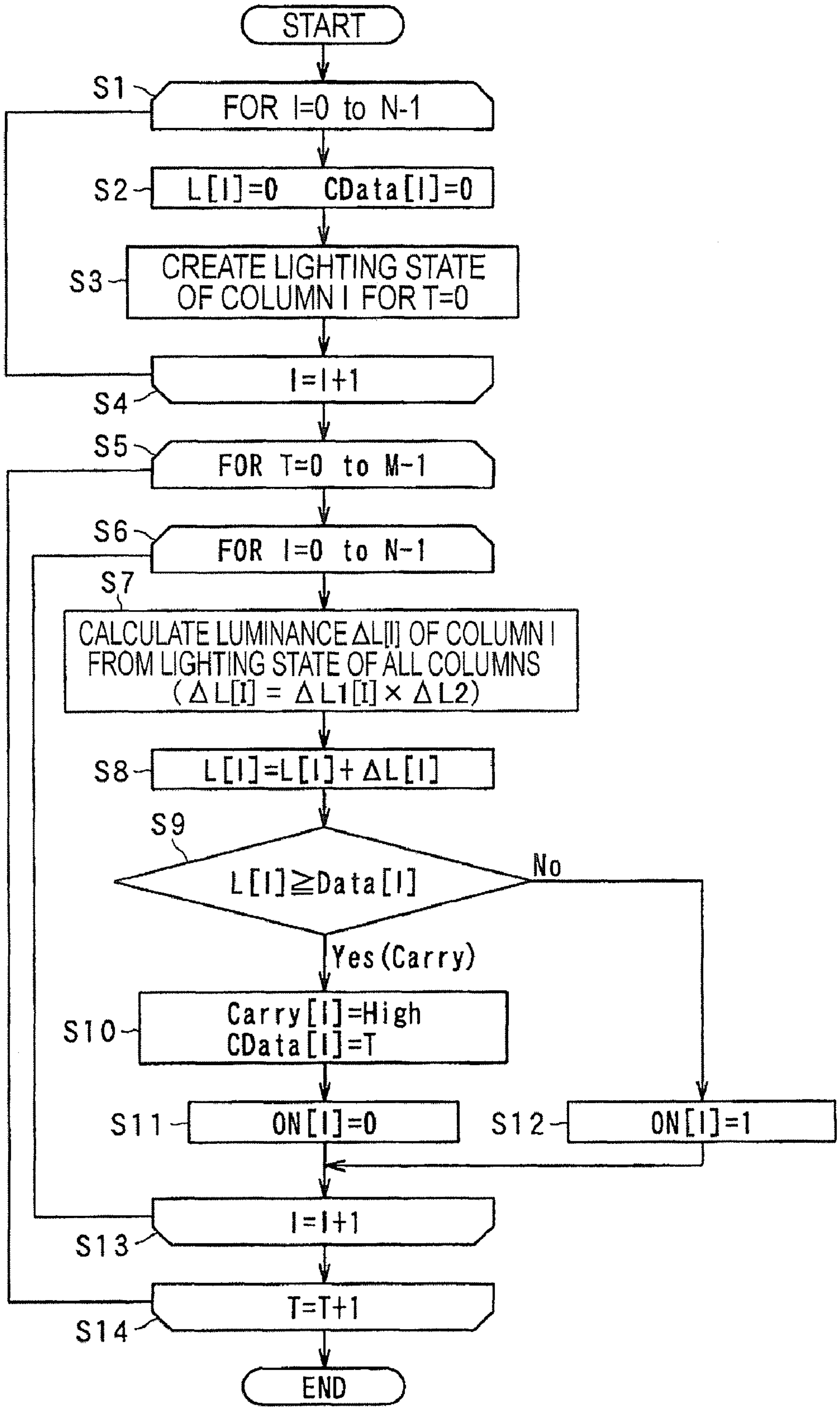
FIG. 3 is a flowchart showing the operation of the corrected data calculation unit according to the first embodiment.

Next, the operation of the corrected data calculation unit 202 is explained with reference to FIG. 3. Although the corrected data calculation unit 202 partially executes the parallel process with plural luminance accumulation circuit 100, the parallel process is shown as a sequential process in the flowchart of FIG. 3 for the convenience of description. In FIG. 3, N represents the number of the column wirings, M: the number of the time slots, Data[I]: the target luminance value of column I, CData[I]: the corrected data of column I, L[I]: the accumulated luminance of column I, ΔL[I]: the instantaneous luminance of column I, and ON[I]: the lighting state of column I (1: lighted, 0: not lighted).

Once the image data D1 of one horizontal scanning period is retrieved, the first step is to initialize the accumulated luminance L[I] and the corrected data CData[I] of each column I to 0 (S2). Incidentally, the corrected data CData[I] is a value held in the register 105. In the presence of N column wirings, I assumes the value of 0 to (N-1)

Next, the lighting pattern calculation circuit 101 analyzes the image data D1 and calculates the lighting pattern at the time point where the calculation time slot T is 0 (S3). When T is 0, the lighting state of the display device on column I is given as described below.

ON (lighted) (1) if the image data D1[I]>0

OFF (not lighted) (0) if the image data D1[I]=0

Upon calculation of the lighting pattern at the time point of the time slot T=0 (S1 to S4), this lighting pattern is input to the ΔL1 calculation circuit 102 in the luminance accumulation circuit 100 of each column. The ΔL1 calculation circuit 102 for column I calculates the first luminance ΔL1[I] of the display device at column I for the time slot T based on the lighting pattern.

The ΔL2 calculation circuit 109 outputs the second luminance ΔL2 with reference to the time slot value obtained from the slot number counter 108.

The multiplier 110 multiplies the first luminance ΔL1[I] by the second luminance ΔL2 and thus calculates the instantaneous luminance ΔL[I] for the time slot T (S7).

Upon calculation of the luminance ΔL[I], the calculation result is input to the accumulation circuit 103. The accumulation circuit 103 accumulates the luminance ΔL[I] in synchronism with the timing signal from the timing controller 107 (S8). Specifically, the instantaneous luminance ΔL[I] for the present slot is added to the accumulated luminance value L[I] up to the preceding slot. At this time, the slot number counter 108 is also counted up. The accumulation circuit 103 outputs the accumulated luminance L[I] to the comparator 104.

The comparator 104 compares the target luminance value Data[I] corresponding to each column wiring with the accumulated luminance L[I] (S9). According to this embodiment, the target luminance value Data[I] is identical with the value of the image data D1[I].

At the time point when the accumulated luminance L[I] is equal to or larger than Data[I], the output Carry[I] of the comparator 104 turns high (S10). Once Carry[I] turns high, the register 105 holds the prevailing value of the slot number counter 108 as the corrected data CData[I] (S10). Carry[I] is supplied also to the lighting pattern calculation circuit 101.

Once Carry[I] turns high, the lighting pattern calculation circuit 101 sets the lighting state ON[I] of the display device at column I to 0 (S11). As a result, the lighting pattern is updated. The lighting pattern thus updated is accessed for the calculation of the luminance ΔL1 of the next slot.

In the case where the accumulated luminance L[I] is smaller than the target value Data[I] in step S9, Carry[I] is low, and therefore, the value of the lighting state ON[I] is maintained at 1 (S12).

The operation of steps S6 to S13 is repeated, and at the time point when the values Carry[I] for the circuits corresponding to all the column wirings turns high, all the values of the corrected data CData[I] for the particular horizontal period are stored in the register 105.

Once the corrected data for all the column wirings for one horizontal scanning period are established, the values thus established are loaded in parallel in the shift register 106. The parallel data in the shift register 106 are serialized based on the signals (shift clock sft_clk, load "load" and the shift enable sft_en) from the timing controller 107. The data thus serialized are supplied to the modulation circuit as corrected data D2.

The operation of the corrected data calculation circuit 202 is summarized as described below.

(1) The lighting pattern calculation circuit 101 calculates the first (T=0) lighting pattern.

(2) The ΔL1 calculation circuit 102, with reference to the lighting pattern, calculates the first luminance ΔL1 including the effect of the voltage drop on the row wiring for each time slot.

(3) The ΔL2 calculation circuit 109, with reference to the time slot value, calculates the second luminance ΔL2 including the effect of the light emission time (pulse width).

(4) The multiplier 110 calculates the luminance ΔL for each time slot from ΔL1 and ΔL2.

(5) The accumulation circuit 103 temporally accumulates the luminance ΔL for each time slot and calculates the accumulated luminance value L.

(6) The comparator 104 and the register 105 store, as the corrected data, the value (the value on the slot number counter) determined in accordance with the time slot at the time point when the accumulated luminance value L reaches the target value Data.

(7) Each time the corrected data for any column is determined, the lighting pattern calculation circuit 101 updates the lighting pattern (turns off the column for which the corrected data is determined).

(8) After the corrected data of all the columns are established, the shift register 106 outputs the corrected data D2 for all the columns. In the process, the comparator 104, the register 105 and the shift register 106 make up the corrected data determination circuit according to the invention.

As described above, the corrected data calculation unit 202 calculates the corrected data while taking the change in the lighting state of each display device due to the correction into consideration, thereby improving the accuracy of the voltage drop correction.

Also, the corrected data calculation unit 202 calculates the luminance taking the phosphor saturation due to the magnitude of the emission current and the length of the light emission time into consideration, thereby further improving the correction accuracy. As a result, the image display of a very high quality is possible.

(Simplified Corrected Data Calculation Unit 202)

Figure 4:
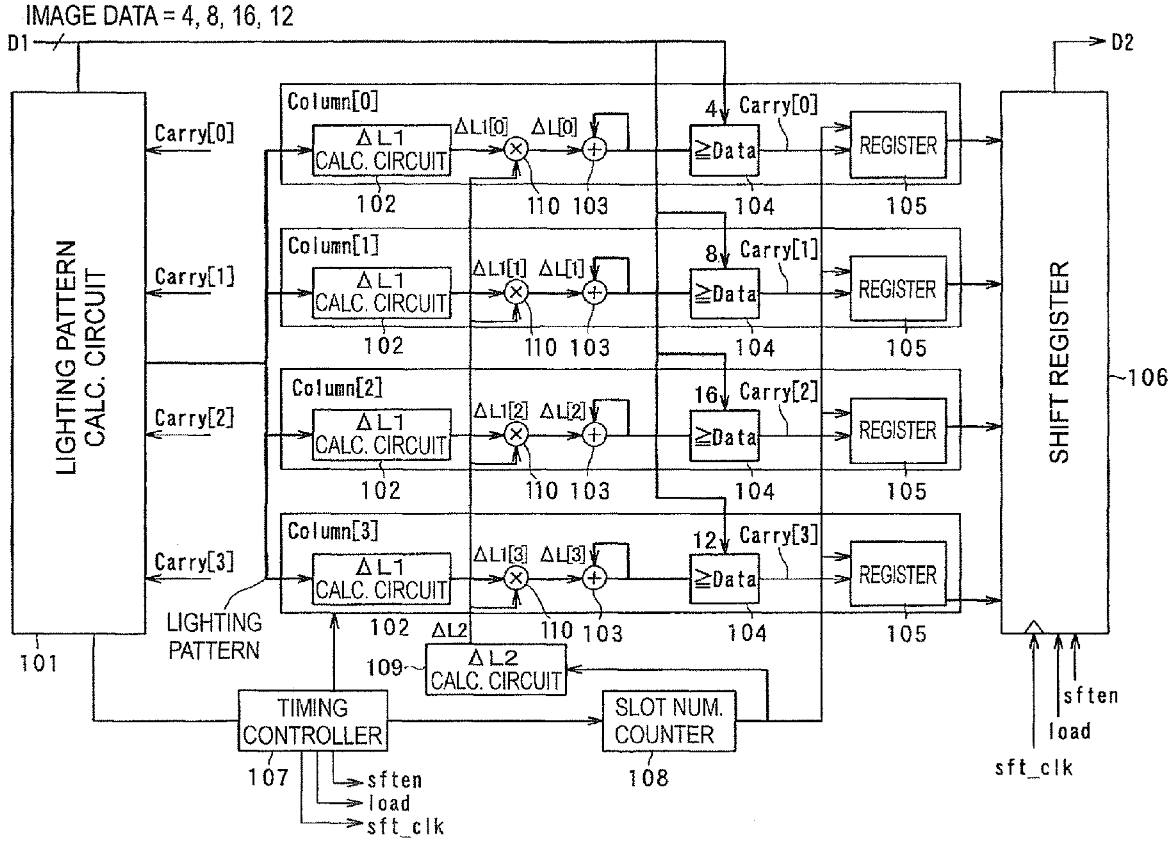
FIG. 4 is a diagram showing a simplified configuration of the corrected data calculation unit according to the first embodiment.

With reference to FIG. 4, the operation of the corrected data calculation unit is specifically explained using a very simplified example. In fact, the column wirings of the image display apparatus, which are usually several hundreds to several thousands in number, are assumed to be four in number to simplify the explanation below.

A case is explained in which the image data D1 of the column wirings are 4, 8, 16, 12 for one given horizontal scanning period. When the image data D1 is input thereto, the lighting pattern calculation circuit 101 calculates the lighting pattern for the time slot T of 0. Since the image data for all the columns are larger than 0, the lighting pattern (1, 1, 1, 1) is obtained, where "1" indicates "on" (lighted) and "0" "off" (not lighted). This corresponds to the light state of the column wirings 0 to 3 in that order from the left side.

The lighting pattern is input to the ΔL1 calculation circuit 102. The ΔL1 calculation circuit 102 calculates the luminance ΔL1 for this lighting pattern. The ΔL2 calculation circuit 109, on the other hand, calculates the luminance ΔL2 for the time slot value. The multiplier 110 multiplies ΔL1 and ΔL2 thereby to calculate the instantaneous luminance ΔL. The accumulation circuit 103 accumulates the instantaneous luminance ΔL for each column and thus calculates the accumulated luminance value L corresponding to each time slot. The comparator 104 compares the accumulated luminance value L with the target luminance value Data for each column.

Figure 5:
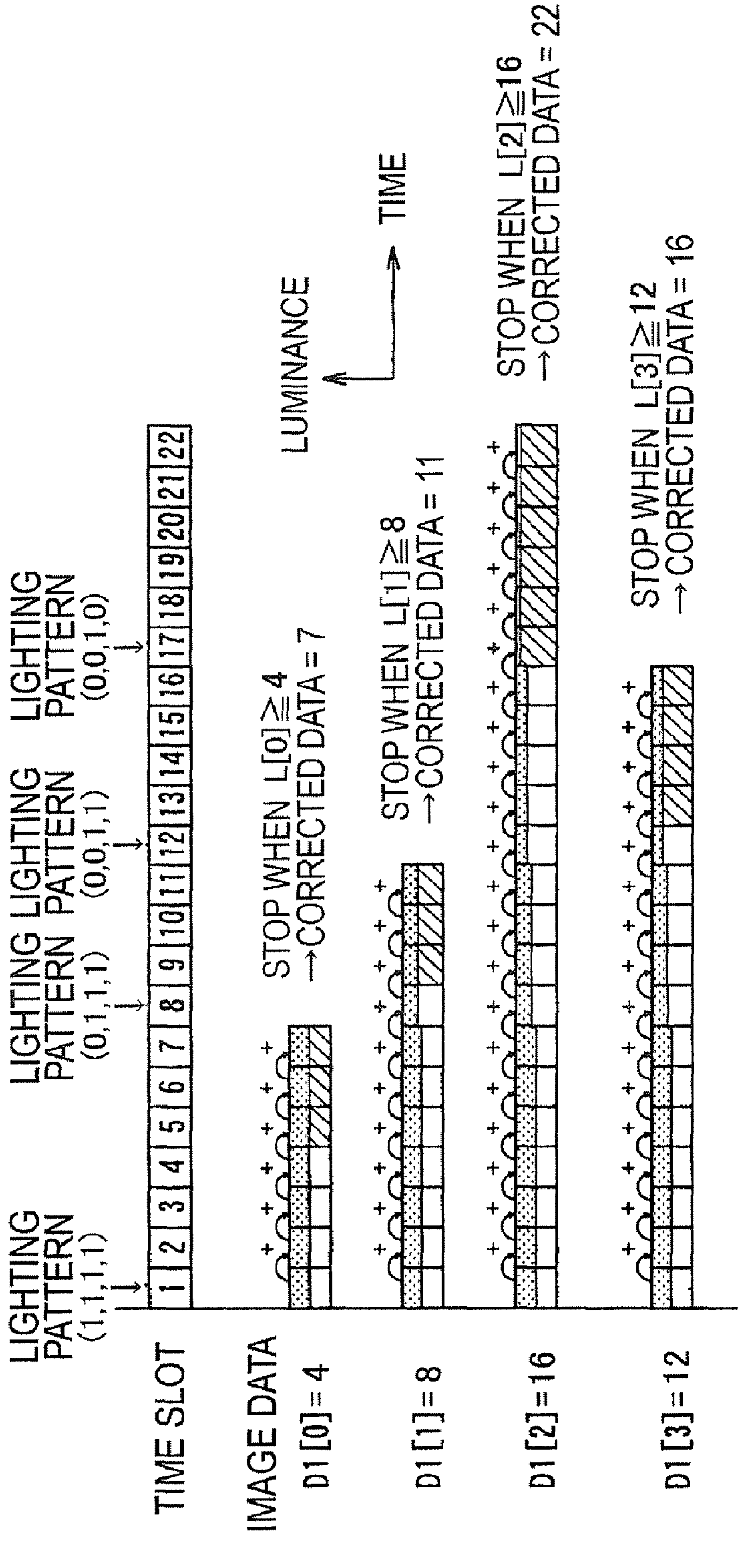
FIG. 5 is a diagram showing an example of calculation of the corrected data in the corrected data calculation unit shown in FIG. 4.

FIG. 5 is a diagram showing an example of the calculation of the corrected data. In FIG. 5, the uppermost graph shows the time slots (time plotted in the horizontal axis). The second to fifth graphs indicate the corrected data of the column wirings 0 to 3, respectively (the vertical axis represents the magnitude of luminance, and the horizontal axis the time).

In the second to fifth graphs, the rectangle of each time slot indicates the luminance ΔL of the slot. The upper dotted part of the rectangle indicates the decrease in luminance due to the voltage drop and the phosphor saturation. The lower white part of the rectangle, on the other hand, indicates the effective luminance. Also, the hatched part indicates the luminance complemented by the extension of the pulse width by the correction calculation.

As to the modulation wiring 0, the image data D1[0] is 4. The accumulation circuit 103 accumulates the luminance ΔL (white part in FIG. 5). The comparator 104 compares the accumulated luminance value L with the image data (=4), and turns Carry[0] high for the time slot (slot 7 in FIG. 5) when the accumulated value L reaches 4. As a result, the corrected data of the column wiring 0 is "7".

The lighting pattern calculation circuit 101 updates the lighting pattern when Carry[0] turns high. The column wirings 0 are turned off (not lighted), and therefore, the lighting pattern changes from (1, 1, 1, 1) to (0, 1, 1, 1). Once the lighting pattern is updated, the effect of the voltage drop amount changes. In FIG. 5, the size of the dotted part is changed before and after the time slot 7.

Next, at the time point when the time slot assumes 11, the accumulated luminance value L of the column wiring 1 increases beyond the image data (=8). As a result, the corrected data of the column wiring 1 is determined as 11, and Carry[1] turns high. The lighting pattern changes from (0, 1, 1, 1) to (0, 0, 1, 1).

Next, at the time point when the time slot becomes 16, the accumulated luminance value L of the column wiring 3 increases beyond the image data (=12). As a result, the corrected data of the column wiring 3 is determined as 16, and Carry[3] turns high. The lighting pattern changes from (0, 0, 1, 1) to (0, 0, 1, 0).

Next, at the time point when the time slot becomes 22, the luminance amount of the column wiring 2 increases beyond the image data (=16). As a result, the corrected data of the column wiring 2 is determined as 22 and Carry[2] turns high.

In the manner described above, the corrected data 7, 11, 22, 16 are obtained for the input image data 4, 8, 16, 12, respectively.

The corrected data obtained in this way is supplied to the modulation circuit for driving, so that the image of high quality substantially free of the effect of the voltage drop can be realized.

Incidentally, the actual image display apparatus includes several hundreds to several thousands column wirings and the slots in the order of several hundreds to several thousands. Nevertheless, the method described with reference to FIGS. 4 and 5 is of course applicable to the actual image display apparatus.

Incidentally, the ΔL1 calculation circuit 102 preferably outputs the first luminance ΔL1 of a different value for a different color of the display devices. Similarly, the ΔL2 calculation circuit 109 preferably outputs the second luminance ΔL2 of a different value for a different color of the display devices. The color image display apparatus generally has the display devices of plural colors (R, G, B) and the phosphor saturation characteristic is varied from one color to another. By carrying out the correction calculation using the luminance (ΔL1, ΔL2) corresponding to the phosphor saturation characteristic for each color, therefore, a more preferable display can be realized. In the case where the R, G, B display devices are arranged along the columns, the contents of the table of the ΔL1 calculation circuit are changed for column. Also, the table of the ΔL2 calculation circuit is provided for each color, the R table value is input to the luminance calculation circuit on column R, the G table value on column G and the B table value on column B.

Also, the width of the time slot constituting the unit time of correction calculation is not necessarily constant, but the time slot width may be changed during the drive period. For example, the time slot may be fine during the period corresponding to low luminance (low gradation) and coarse during the period corresponding to high luminance (high gradation). In the case where the slot width is changed in this way, however, the value of the luminance ΔL per slot and the count-up of the slot number counter are required to be adjusted appropriately in accordance with the slot width. By changing the slot width in this way, the greater advantage can be achieved that the number of the luminance calculation steps can be reduced and so can the clock frequency of the correction circuit. Also, with regard to the magnitude of luminance, the visual characteristic of the human being tends to be higher in resolution, the lower the gradation, and vice versa. Taking this point into consideration, the disuniform time slots are more advantageous from the viewpoint of error correction.

According to the embodiments described above, the image data value is used as a target luminance value compared with the accumulated luminance value. The target luminance value, however, is not required to coincide with the image data value. The target luminance value may be varied, for example, with a particular reference used to normalize the luminance ΔL calculated by the ΔL1 calculation circuit and the ΔL2 calculation circuit. Also, a similar correction effect can be obtained even by the use of the target luminance by a predetermined value smaller (or larger) than the image data.

Second Embodiment

In the first embodiment, as shown in FIG. 1, the luminance accumulation circuit is arranged for each column wiring. According to the second embodiment, in contrast, plural column wirings are divided into plural blocks, and the luminance accumulation circuit is arranged for each block. By executing the process block by block, the corrected data can be calculated quickly while at the same time making it possible to reduce the circuit size advantageously.

Figure 7:
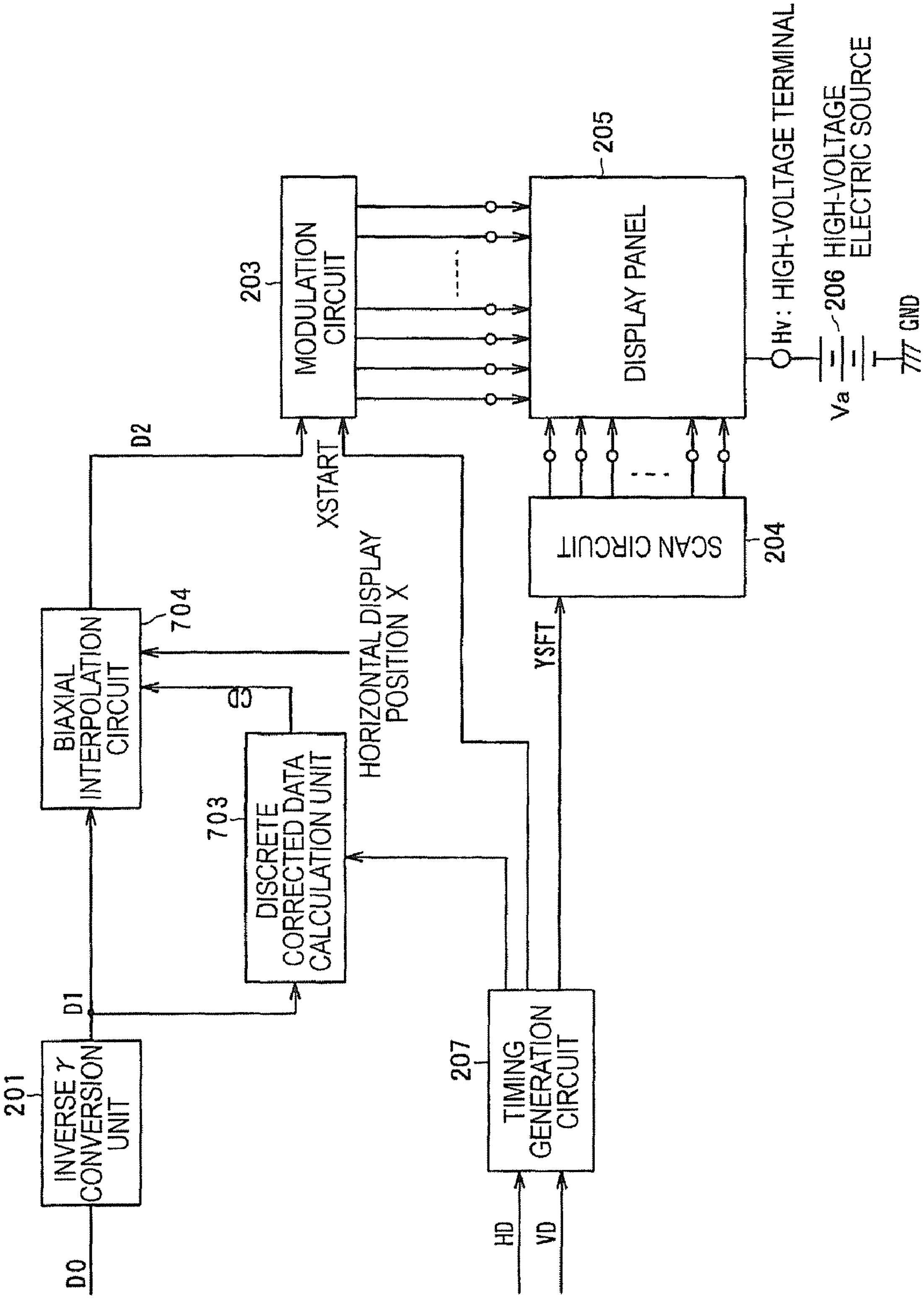
FIG. 7 is a block diagram showing an image display apparatus according to the second embodiment.

FIG. 7 is a diagram showing the configuration of the image display apparatus according to the second embodiment. The difference from the first embodiment lies in that the corrected data calculation unit 202 is replaced by a discrete corrected data calculation unit 703 and a biaxial interpolation circuit 704. In this embodiment, the discrete corrected data calculation unit 703 and the biaxial interpolation circuit 704 make up a correction circuit. The other parts of the configuration are similar to the corresponding parts of the first embodiment. The description that follows is centered on the configuration unique to the second embodiment, and the parts having the same configuration as those of the first embodiment are not described.

As explained above, the plural column wirings are divided into plural blocks, and a node is set for each block. Typically, the column wiring at the center of the block is selected as a node. Each node can be considered a reference position set on the row wiring. Also, with regard to the value of the image data, plural reference values of the image data are set in advance. In the case where the image data assume the values 0 to 255, for example, the image data reference values are determined as 0, 4, 8, 12, 16, . . . , 252, and 255. Incidentally, the number of blocks, the reference position (node position), the number of the image data reference values and the steps may be arbitrarily determined.

The discrete corrected data calculation unit 703 calculates the accumulated luminance value corresponding to each reference position taking the voltage drop at each reference position into consideration, and thus calculates the discrete corrected data for each reference position. Also, the discrete corrected data calculation unit 703 calculates the discrete corrected data for each image data reference value using the aforementioned image data reference value as a target luminance value. As a result, the corrected data are obtained discretely for plural reference positions on the row wiring and plural reference values of the image data. This discrete corrected data CD is input to the biaxial interpolation circuit 704.

The biaxial interpolation circuit 704 interpolates the discrete corrected data over two axes along the rows and the direction of the image data value and generates the corrected data D2 corresponding to the value of the image data D1 for each column wiring (horizontal display position X). An arbitrary interpolation method such as the linear interpolation can be employed. An example of the interpolation method is described in Japanese Patent Application Laid-Open No. 2003-223131 (US 2003/0006976 A1; U.S. Pat. No. 7,079,161). The corrected data D2 is input to the modulation circuit 203. The modulation circuit 203 executes the pulse width modulation in accordance with the corrected data D2 and outputs a modulation signal to the column wirings.

(Discrete Corrected Data Calculation Unit 703)

Figure 6:
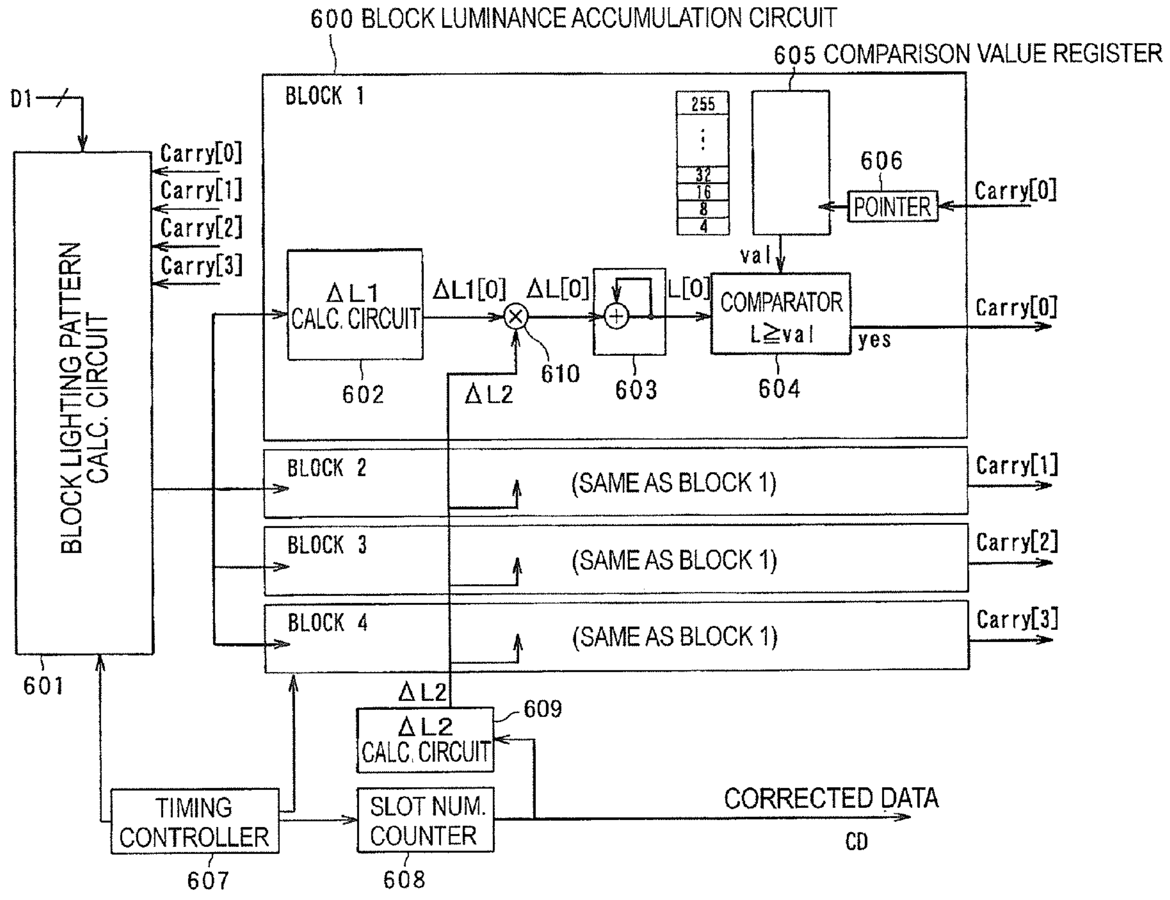
FIG. 6 is a diagram showing a configuration of a discrete corrected data calculation unit according to a second embodiment.

FIG. 6 shows the configuration of the discrete corrected data calculation unit. The discrete corrected data calculation unit 703 includes a block lighting pattern calculation circuit 601, a block luminance accumulation circuit 600, a timing controller 607, a slot number counter 608, a ΔL2 calculation circuit 609 and a multiplier 610. The block luminance accumulation circuit 600 is configured of a ΔL1 calculation circuit 602, an accumulation circuit 603, a comparator 604, a comparison value register 605 and a pointer 606. The block luminance accumulation circuit 600 is provided for each block.

Figure 8:
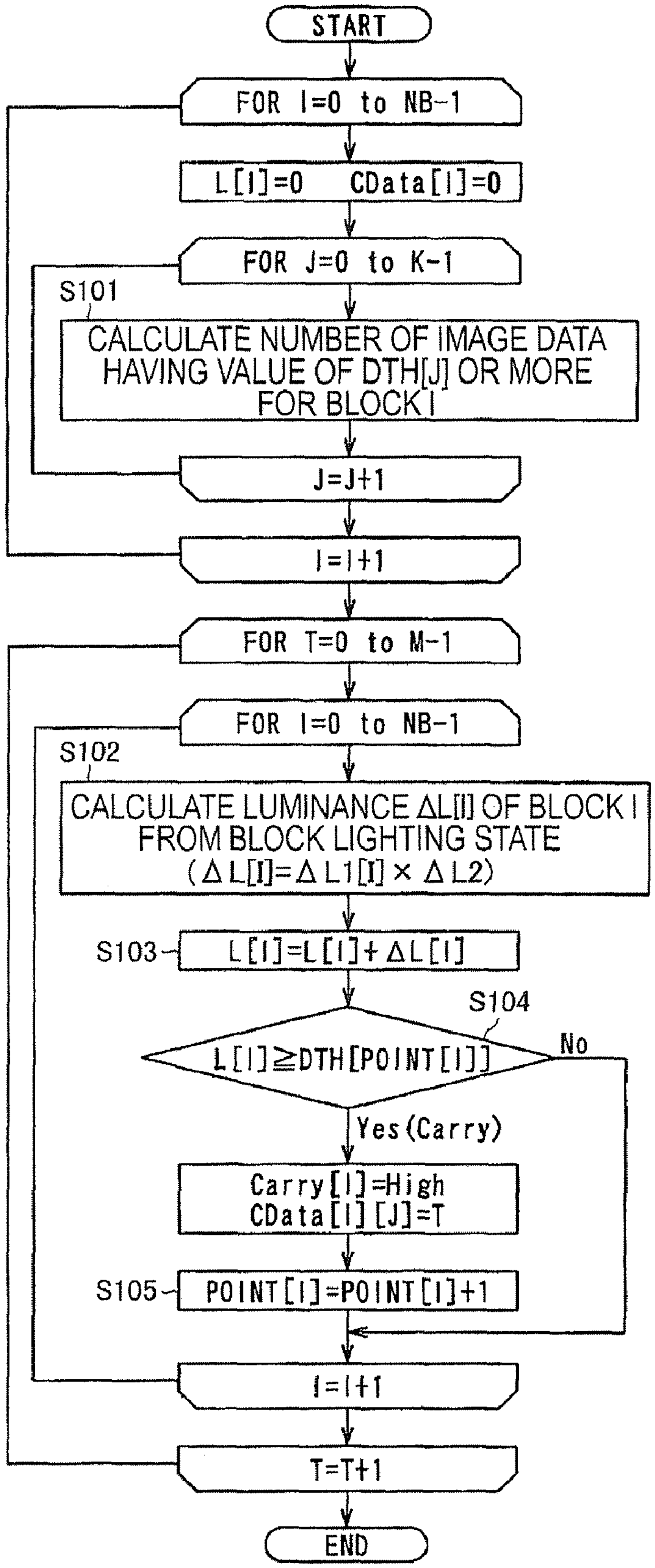
FIG. 8 is a flowchart showing the operation of the discrete corrected data calculation unit according to the second embodiment.

FIG. 8 is a flowchart for explaining the operation of the circuit shown in FIG. 6. Incidentally, the flowchart is described as a sequential process instead of as a parallel process for the convenience of explanation. In FIG. 8, NB represents the number of the blocks, M: the number of the time slots, K: the number of the image data reference values, DTH[I]: the I-th image data reference value, CData[I][J]: the corrected data for the J-th image data reference value of the block I, L[I]: the accumulated luminance of block I, ΔL[I]: the instantaneous luminance of block I, and POINT[I]: the pointer of block I.

Like in the first embodiment, the time slot for calculation is determined by the clock signal output from the timing controller 607.

The block lighting pattern calculation circuit 601 calculates the lighting pattern of four blocks. Although the lighting state of each column wiring is indicated by one on/off bit in the first embodiment, the lighting state of each block is indicated by 3-bit data proportional to the lighting ratio in the second embodiment. The lighting ratio is defined as the ratio of the display devices turned on to all the display devices making up the block.

The block lighting pattern calculation circuit 601 calculates the histogram of the image data for each block with reference to the image data (S101 in the flowchart). FIG. 11 shows an example of the histogram calculated from the image data on a given one row. The block lighting pattern calculation circuit 601 counts the number of the image data having a higher value than each image data reference value, and converts the count into a 3-bit value (0 to 7 in binary number) for each image data reference value. This 3-bit value indicates the ratio of the count to the number of the image data in one block. Specifically, this 3-bit value represents the ratio of the number of the turned-on display devices to the number of all the display devices in one block for the slot corresponding to the image data reference value. According to this embodiment, the value of the histogram shown in FIG. 11 is used as a lighting pattern.

The lighting pattern expressed in three bits for each block, i.e. a total of 12 bits is input to the ΔL1 calculation circuit 602 of the block luminance accumulation circuit 600. In the first time slot, the value (7, 7, 7, 7) of "≧0" is selected as the lighting pattern.

The ΔL1 calculation circuit 602 calculates the first luminance ΔL1[I] for each slot of each block in accordance with this 12-bit lighting pattern. In the process, the ΔL1 calculation circuit 602 outputs the luminance value corresponding to the column wiring (node) at the center of the block I as the luminance ΔL1[I] of the block I. The luminance ΔL1[I] is a value calculated by the same method as in the first embodiment, and indicates the luminance taking the voltage drop of the row wiring and the saturation in the direction of the emission current into consideration. Incidentally, also according to this embodiment, the ΔL1 calculation circuit 602 is preferably configured of a look-up table which stores the values ΔL1 corresponding to the lighting patterns.

The ΔL2 calculation circuit 609, like the corresponding circuit of the first embodiment, is arranged to take the phosphor saturation in the direction along the pulse width into consideration. The ΔL2 calculation circuit 609 outputs the second luminance ΔL2 corresponding to each time slot value based on the count on the slot number counter 608. The ΔL2 calculation circuit 609 is also preferably configured of a look-up table.

The luminance ΔL1[I] of each block is multiplied by ΔL2 obtained from the ΔL2 calculation circuit 609 and input to the accumulation circuit 603 (S102). The accumulation circuit 603 accumulates the instantaneous luminance ΔL in keeping with the count-up of the slot number counter 608 and thereby calculates the accumulated luminance value L up to the particular time slot (S103). The accumulated luminance value L is input to the comparator 604.

The comparator 604 compares the accumulated luminance value L with the image data reference value DTH. Once the accumulated value L reaches the image data reference value DTH, the comparator 604 turns Carry high (S104).

After Carry turns high, the pointer 606 advances the pointer by one so that the value on the comparison value register 605 changes by one (S105). The comparison value register 605 has recorded therein predetermined plural image data reference values, and with the change in the pointer 606, the next reference value is input to the comparator 604. In the beginning of accumulation (when the time slot is 0), the value on the pointer 606 is reset and the smallest image data reference value is input to the comparator 604.

The value on the slot number counter at the time point when Carry of a given block turns High is the corrected data value corresponding to the image data reference value that has been input to the comparator at the particular time point.

The Carry signal of each block is fed back to the block lighting pattern calculation circuit 601 and the block lighting pattern is updated correspondingly. Once the Carry signal turns High, the lighting pattern of the corresponding block is changed to the lighting state corresponding to the next data reference value.

According to this embodiment, this operation is repeated thereby to calculate the corrected data for the discrete image data reference value for each block.

The corrected data calculated in this way is input to the biaxial interpolation circuit as described above to conduct the interpolation in accordance with the image data and the horizontal position (column wiring number) of the screen. In this way, the corrected data corresponding to the image data value of each column wiring is calculated.

As the result of this calculation of the corrected data, it has been found that the calculation amount is decreased more than in the first embodiment for a large reduction in the hardware amount. The further study of the effect of the correction has made it clear that though inferior to the first embodiment due to the error caused by the interpolation, the correction accuracy is improved as compared with the prior art, and an image very high in quality can be displayed.

According to this embodiment, the discrete corrected data is calculated for the horizontal position of the row wiring and the image data value. Nevertheless, this invention is not limited to this method. For example, only the direction of the image data value or only the horizontal direction of the screen may be discretized with equal effect.

Incidentally, the ΔL1 calculation circuit 602 may output the first luminance ΔL1 of a different value for a different color of the display devices. The ΔL2 calculation circuit 609 may also output the second luminance ΔL2 of a different value for a different color of the display devices. The color image display apparatus generally includes display devices of plural colors (R, G, B), and the phosphor saturation characteristic is varied from one color to another. By performing the correction operation using the luminance (ΔL1, ΔL2) corresponding to the phosphor saturation characteristic for each color, therefore, a more preferable display can be realized. Specifically, the ΔL1 calculation circuit (look-up table) for each color is included in one block luminance accumulation circuit 600. Also, an independent value for each color is output from the ΔL2 calculation circuit to the block luminance accumulation circuit 600.

Also, the width of the time slot constituting the unit time of the correction operation is not necessarily constant. The width of the time slot may be changed during the drive period. For example, the time slot may be fine during the period corresponding to a low luminance (low gradation) and coarse during the period corresponding to a high luminance (high gradation). In the case where the slot width is changed in this way, however, the luminance value ΔL per slot and the count-up of the slot number counter are required to be adjusted in accordance with the slot width. By changing the slot width in this way, the number of steps for the luminance calculation can be reduced and further the clock frequency of the correction circuit can be reduced advantageously.

Also, the image data reference values may not be set at regular intervals but can be set at unequal pitches. This reduces the number of the image data to be accessed in the biaxial interpolation circuit, and therefore, the circuit configuration can be simplified. In the low luminance area (area with a small image data) requiring a high accuracy, the image data reference values may be set at short pitches, and at longer pitches in the high luminance area (area with a large image data). In this way, the circuit size can be reduced without reducing the correction accuracy.

Also, with regard to the magnitude of luminance, the visual characteristic of the human being is such that the resolution tends to be higher, the lower the gradation, and vice versa. Taking this point into consideration, it is more advantageous to set the time slots at unequal pitches only from the viewpoint of the correction error.

According to the embodiment described above, the image data reference value is used as a target luminance value compared with the accumulated luminance value. The target luminance value and the image data reference value, however, are not necessarily coincident with each other. For example, the target luminance value may vary with a particular reference according to which the luminance ΔL calculated by the ΔL1 calculation circuit and the ΔL2 calculation circuit are normalized. Also, a similar correction effect can be achieved by the use of a luminance target by a predetermined value smaller (or larger) than the image data reference.

<Modification>

According to the first and second embodiments, the correction is made by increasing the image data value to compensate for the luminance reduction by the effect of the voltage drop. Nevertheless, the image data value generally has a certain upper limit. To achieve a satisfactory correction, therefore, the adjustment is preferable by which the image data after correction assumes a value within the particular limit. For this purpose, the maximum value of the image data after correction is adjusted by a limiter or the gain of the image data before or after correction is adjusted. This technique is already disclosed by the present inventor in Japanese Patent Application Laid-Open No. 2003-233344 (US 2003/030654 A1; U.S. Pat. No. 6,873,308). By combining this technique with this invention, the correction can be suitably carried out on the one hand and the maximum value of the image data can be suitably adjusted at the same time.

In the image display apparatus having the surface conduction electron-emitting device, several types of the conventional correction circuits are known as a configuration to realize a high-quality image display. Japanese Patent Application Laid-Open No. 2005-031636 (US 2004/257311 A1; U.S. Pat. No. 7,046,219; US 2006/192493 A1; U.S. Pat. No. 7,432,884) discloses a configuration for suppressing the reduction in image quality which otherwise might be caused by the halation (correction of the halation). Japanese Patent Application Laid-Open No. 07-181911, on the other hand, discloses a configuration for correcting the variations of the device luminance (correction of uniformity). The prevent inventor has confirmed that a more preferable display can be made possible by combining these correction methods with the correction method according to the present invention. As to the order of correction, the image data subjected to the inverse γ conversion is first corrected in halation, after which the uniformity is corrected. Further, on the subsequent image data, the voltage drop is corrected according to the invention. As a result, a more preferable image display can be realized.

Further, in the case where the light emission characteristic of the phosphor is nonlinear with respect to the drive operation, a table may be arranged to offset the phosphor nonlinearity before or after the voltage drop correction. This further makes it possible to realize a preferable image display.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-50346, filed on Feb. 29, 2008, which is hereby incorporated by reference herein in its entirety.

What is claimed is:

1. An image display apparatus for driving a plurality of display devices through a plurality of row wirings and a plurality of column wirings in matrix, comprising:

a correction circuit that outputs corrected data based on luminance data designating luminance of the display device; and a modulation circuit that outputs a pulse width modulation signal for driving the display device to the column wiring based on the corrected data, wherein the correction circuit includes:

a luminance calculation circuit that calculates luminance including an effect of a voltage drop in the row wiring and an effect of a light emission time of the display device for each predetermined time slot;

an accumulation circuit that temporally accumulates the luminance for each time slot; and a corrected data determination circuit that outputs, as the corrected data, a value determined in accordance with the time slot at a time point when an accumulated luminance value obtained by the temporal accumulation reaches a target luminance value, wherein the luminance calculation circuit includes:

a first luminance calculation circuit that calculates a first luminance including the effect of the voltage drop in the row wiring based on a lighting pattern indicating a lighting state of one row of the display devices at the time point of the time slot;

a second luminance calculation circuit that calculates a second luminance including the effect of the light emission time of the display device based on a value of the time slot; and a totaling circuit that calculates the luminance for the time slot based on the first luminance and the second luminance.

2. An image display apparatus according to claim 1, wherein the first luminance calculation circuit is a look-up table which stores values of the first luminance corresponding to the lighting patterns.

3. An image display apparatus according to claim 1, wherein the second luminance calculation circuit is a look-up table which stores values of the second luminance corresponding to values of the time slot.

4. An image display apparatus according to claim 1, wherein the display devices of plural colors are included, and wherein the first luminance calculation circuit outputs the first luminance of a different value for a different color of the display devices.

5. An image display apparatus according to claim 1, wherein the display devices of plural colors are included, and wherein the second luminance calculation circuit outputs the second luminance of a different value for a different color of the display devices.

6. An image display apparatus according to claim 1, wherein the first luminance is a value indicating a ratio to luminance free of the effect of the voltage drop, wherein the second luminance is a value indicating a ratio to luminance free of the effect of the light emission time, and wherein the totaling circuit is a multiplier which multiplies the first luminance by the second luminance.

7. An image display apparatus according to claim 1, wherein the lighting pattern is changed when the accumulated luminance value reaches the target luminance value.

8. An image display apparatus according to claim 1, wherein the plurality of the column wirings are divided into a plurality of blocks, wherein the luminance calculation circuit and the accumulation circuit calculate the accumulated luminance value for each block, wherein the corrected data determination circuit outputs discrete corrected data for each block based on the accumulated luminance value for each block, and wherein the correction circuit includes an interpolation circuit which generates the corrected data for each column wiring by interpolating the discrete corrected data for each block.

9. An image display apparatus according to claim 8, wherein the corrected data determination circuit outputs the discrete corrected data for each reference value by using predetermined reference values as the target luminance value, and wherein the interpolation circuit generates the corrected data corresponding to the value of the luminance data by interpolating the discrete corrected data for each reference value.

10. An image display apparatus according to claim 1, wherein each of the display devices is a cold cathode device for emitting electrons to a phosphor, and wherein the effect of the light emission time of the display device is caused by a saturation characteristic of the phosphor.

11. An image display apparatus according to claim 10, wherein the cold cathode device is a surface conduction electron-emitting device.

12. An correction circuit for an image display apparatus, wherein the image display apparatus drives a plurality of display devices through a plurality of row wirings and a plurality of column wirings in matrix and includes a modulation circuit for outputting a pulse width modulation signal for driving the display device to the column wiring, the correction circuit comprising:

a luminance calculation circuit that calculates luminance including an effect of a voltage drop in the row wiring and an effect of a light emission time of the display device for each predetermined time slot;

an accumulation circuit that temporally accumulates the luminance for each time slot; and a corrected data determination circuit that outputs, as a corrected data, a value determined in accordance with the time slot at a time point when an accumulated luminance value obtained by the temporal accumulation reaches a target luminance value, wherein the luminance calculation circuit includes:

a first luminance calculation circuit that calculates a first luminance including the effect of the voltage drop in the row wiring based on a lighting pattern indicating a lighting state of one row of the display devices at the time of the time slot;

a second luminance calculation circuit that calculates a second luminance including the effect of the light emission time of the display device based on a value of the time slot; and a totaling circuit that calculates the luminance for the time slot based on the first luminance and the second luminance.

13. An image display apparatus driving method for driving a plurality of display devices through a plurality of row wirings and a plurality of column wirings in matrix, comprising:

a correction step of outputting corrected data based on luminance data designating luminance of the display device; and a modulation step of outputting a pulse width modulation signal for driving the display device to the column wiring based on the corrected data, wherein the correction step includes:

a luminance calculation step of calculating luminance including an effect of a voltage drop in the row wiring and an effect of a light emission time of the display device for each predetermined time slot;

a step of temporally accumulating the luminance for each time slot; and a step of outputting, as the corrected data, a value determined in accordance with the time slot at a time point when an accumulated luminance value obtained by the temporal accumulation reaches a target luminance value, wherein the luminance calculation step includes the steps of:

calculating a first luminance including the effect of the voltage drop in the row wiring based on a lighting pattern indicating a lighting state of one row of the display devices at the time point of the time slot;

calculating a second luminance including the effect of the light emission time of the display device based on a value of the time slot; and calculating the luminance for the time slot based on the first luminance and the second luminance.

* * * * *